Patented Oct. 11, 1927.

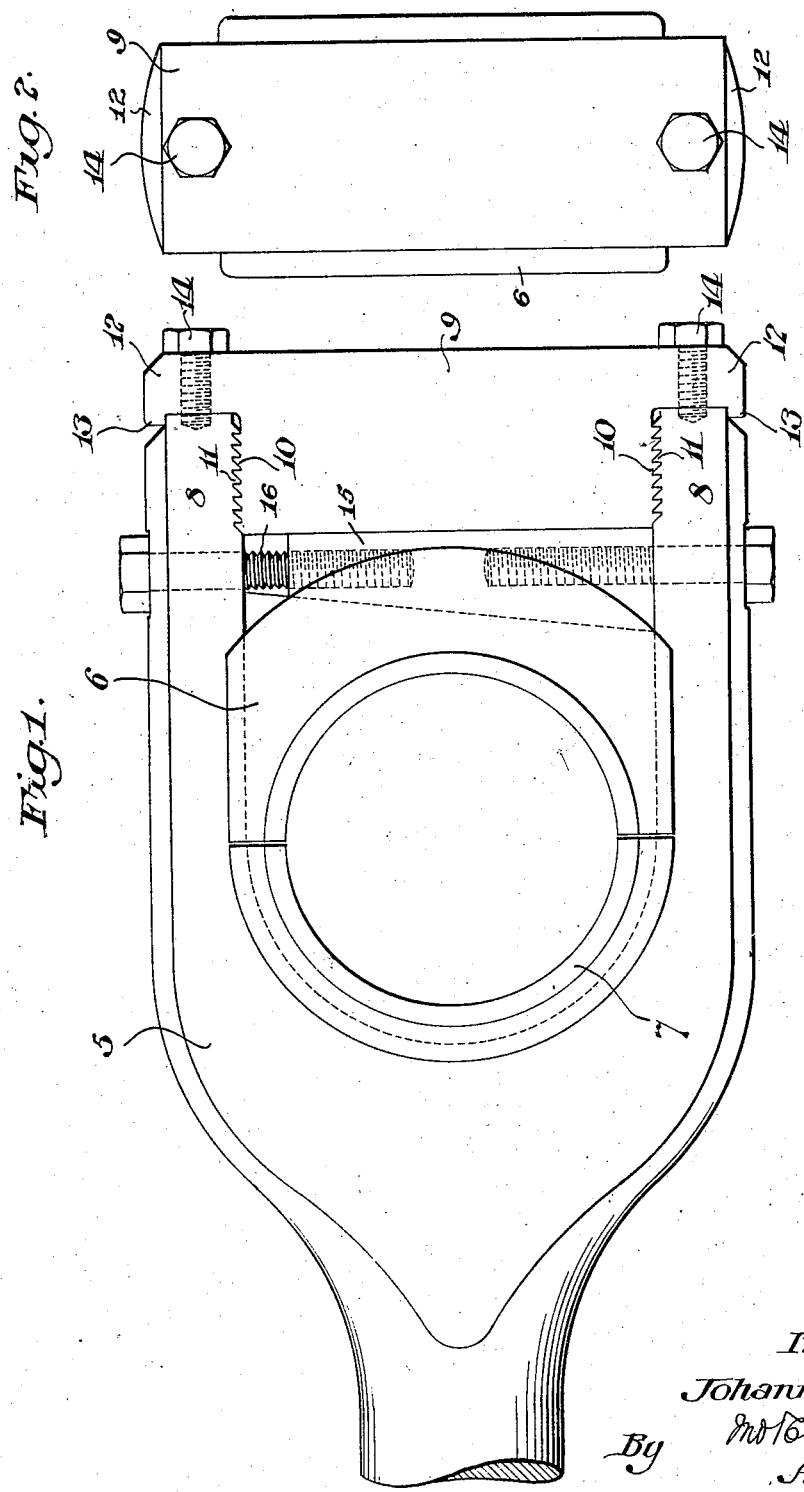

1,644,756

UNITED STATES PATENT OFFICE.

JOHANN STUMPF, OF BERLIN, GERMANY.

CONNECTING ROD.

Application filed October 28, 1924. Serial No. 746,356.

The invention relates to connecting rods for engines and the like. The object is to provide an improved connecting rod with an open end that may be quickly and securely closed.

The invention comprises a fork shaped end, the inner surfaces of the two prongs or extensions being serrated transversely, and a keeper having corresponding and cooperating serrations adapted to slide transversely between the two prongs, with a part of said keeper overlapping the extreme ends of the prongs with projections or flanges extending back over the outer edges of said prong ends to prevent spreading of the prongs. Suitable means such as bolts or pins are also provided for securing the keeper in position against lateral movement.

Referring to the drawings which illustrate, merely by way of example, a suitable embodiment of my invention;—

Fig. 1 is an elevation of the connecting rod end.

Fig. 2 is an end elevation.

Similar numerals refer to similar parts throughout the several views.

The connecting rod 5 is shown with an open or bifurcated end or head for inserting the bearing-box elements 6 and 7. The bearing-box elements are channeled and slide into position between the prongs 8. The usual adjusting wedge 15 is provided with the adjusting screws 16 as indicated. The keeper 9 is provided with the straight parallel serrations 10, while the inner surfaces of the prongs 8 are provided with complementary lateral serrations 11 for cooperating with serrations 10 when the keeper 9 is inserted between said prongs 8. Each serration has one face in a plane at right angles with the longitudinal extension of the connecting rod, while the other face of each serration is inclined thereto. The right angularly arranged cooperating faces are so disposed as to take the thrust upon the keeper or block 9 away from the crankpin. The keeper 9 is also provided with portions or extensions 12 overlying the ends of the prongs 8, and at the outer ends of these extensions 12 are provided overhanging flanges 13 for engaging the outer margins of the ends of said prongs 8, and serve, when in position, to prevent the prongs from spreading. Suitable means such as the bolts 14 passing through the extensions 12 into the ends of prongs 8 serve to secure the keeper in position against lateral movement with respect to the piston rod end.

What I claim is:

A connecting rod having a bifurcated end, the inner faces of the prongs being in parallel planes provided with straight serrations transverse the longitudinal extension of the rod, a keeper having corresponding serrations cooperating with the first mentioned serrations, said keeper also having integral portions extending across the ends of the prongs and further integral extensions overhanging and engaging the outer margins of said prongs, in combination with the usual bearing box elements, between the prongs, and an adjustable wedge between a bearing box element and the keeper.

JOHANN STUMPF.